US008645455B2

(12) United States Patent
Devarakonda et al.

(10) Patent No.: US 8,645,455 B2
(45) Date of Patent: *Feb. 4, 2014

(54) ANALYZING ANTICIPATED VALUE AND EFFORT IN USING CLOUD COMPUTING TO PROCESS A SPECIFIED WORKLOAD

(75) Inventors: Murthy V. Devarakonda, Peekskill, NY (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/474,304

(22) Filed: May 17, 2012

(65) Prior Publication Data
US 2012/0232864 A1 Sep. 13, 2012

Related U.S. Application Data

(63) Continuation of application No. 12/652,546, filed on Jan. 5, 2010, now Pat. No. 8,229,999.

(51) Int. Cl.
*G06F 15/16* (2006.01)
(52) U.S. Cl.
USPC ........... 709/201; 709/224; 709/226; 718/102; 703/2; 703/22
(58) Field of Classification Search
USPC .......... 709/201, 224, 226; 718/102; 703/2, 22
See application file for complete search history.

(56) References Cited

U.S. PATENT DOCUMENTS

| 7,941,332 | B2 * | 5/2011 | Liu et al. ...................... 705/7.11 |
| 8,037,187 | B2 * | 10/2011 | Dawson et al. ............... 709/226 |
| 8,131,843 | B2 | 3/2012 | Yellin et al. |
| 2010/0250642 | A1 * | 9/2010 | Yellin et al. ................... 709/201 |
| 2011/0166835 | A1 | 7/2011 | Devarakonda et al. |
| 2011/0231899 | A1 * | 9/2011 | Pulier et al. ....................... 726/1 |
| 2011/0270968 | A1 * | 11/2011 | Salsburg et al. .............. 709/224 |

OTHER PUBLICATIONS

Notice of Allowance regarding U.S. Appl. No. 12/652,546, dated Mar. 13, 2012, 17 pages.

* cited by examiner

*Primary Examiner* — Wing F Chan
*Assistant Examiner* — Hitesh Patel
(74) *Attorney, Agent, or Firm* — Yee & Associates, P.C.; Louis J. Percello (57) ABSTRACT

Workloads that are and are not appropriate for transformation and processing on a cloud computing environment are identified. A user entity is provided with a measurement of at least one of the value which will be realized, and the effort which will be required. A plurality of attributes is specified. Input data represents the extent to which the user entity processing system possesses the given attribute. The input data for each attribute is employed to derive a corresponding numerical parameter value, which are to compute a final score.

16 Claims, 6 Drawing Sheets

| WORKLOADS | MW, SW, FACILITIES MATURITY | VIRTUALIZATION MATURITY | UTILIZATION IMPROVEMENT OPPORTUNITIES | IT AUTOMATION MATURITY | WORKLOAD STANDARDIZATION OPPORTUNITIES | DATA CONSTRAINTS | BUSINESS AND IT PROCESS IMPROVEMENT OPPORTUNITIES | % OF TOTAL REVENUE AFFECTED | % OF TOTAL COST AFFECTED |
|---|---|---|---|---|---|---|---|---|---|
| (1) WEB SERVING | LOW | LOW | HIGH | MED | MED | MED | LOW | 11 - 20% | 11 - 20% |
| (2) WEB APPLICATIONS | HIGH | MED | MED | MED | LOW | LOW | N/A | N/A | 21 - 30% |
| (3) BI DATA WAREHOUSE | HIGH | HIGH | LOW | HIGH | LOW | HIGH | LOW | 11 - 20% | 11 - 20% |
| (4) ERP, SCM | HIGH | LOW | MED | HIGH | LOW | HIGH | MED | 0 - 10% | 31 - 40% |
| (5) ANALYTICS | MED | MED | LOW | MED | LOW | MED | LOW | 11 - 20% | 11 - 20% |
| (6) NUMERICAL, BATCH | MED | MED | MED | MED | MED | LOW | MED | 0 - 10% | 0 - 10% |
| (7) COLLABORATION | LOW | LOW | HIGH | LOW | HIGH | LOW | HIGH | 0 - 10% | 0 - 10% |
| (8) FILE AND PRINT | MED | LOW | HIGH | LOW | MED | LOW | HIGH | 0 - 10% | 0 - 10% |
| (9) DESKTOP | MED | LOW | MED | MED | HIGH | LOW | HIGH | 0 - 10% | 21 - 30% |
| (10) DEVELOPMENT AND TEST | MED | LOW | MED | MED | MED | LOW | HIGH | 11 - 20% | 11 - 20% |

| | WORKLOADS | VALUE SCORE | EFFORT SCORE |
|---|---|---|---|
| (1) | WEB SERVING | 8.30 | 6.16 |
| (2) | WEB APPLICATIONS | 6.35 | 4.45 |
| (3) | BI DATA WAREHOUSE | 3.00 | 6.27 |
| (4) | ERP, SCM | 3.44 | 8.42 |
| (5) | ANALYTICS | 6.15 | 5.79 |
| (6) | NUMERICAL, BATCH | 7.25 | 4.13 |
| (7) | COLLABORATION | 7.93 | 5.34 |
| (8) | FILE AND PRINT | 7.50 | 5.79 |
| (9) | DESKTOP | 6.57 | 4.34 |
| (10) | DEVELOPMENT AND TEST | 8.29 | 4.26 |

ANALYZING ANTICIPATED VALUE AND EFFORT IN USING CLOUD COMPUTING TO PROCESS A SPECIFIED WORKLOAD

This application is a continuation of application Ser. No. 12/652,546 filed Jan. 5, 2010, status allowed.

BACKGROUND

1. Field

The disclosure relates generally to a method for analyzing and assessing both the value and effort that is anticipated, if cloud computing is used to process a specified workload associated with a user entity, rather than using the processing resources of the user entity for such task. The disclosure relates more specifically to a method of the above type, wherein input data is acquired to characterize the user entity IT resources, IT management practices, and the workload and the business practices around the workload, and the input data is then used by an analytical tool to compute both the anticipated value and the anticipated effort.

2. Description of the Related Art

Cloud computing is increasingly being used by user entities such as businesses and other organizations to service their data processing workloads. Generally, cloud computing customers do not own the physical computing resources or infrastructure of the cloud. Instead, a cloud user entity consumes data processing resources as a service, in order to process particular workloads that are delivered or routed using the resources and services provided by the cloud computing environment. Before the cloud delivered services can be used to process the workload, the workload is transformed into a form that is compatible with the cloud resources. The cloud user entity thus pays only for the cloud resources that are actually used while processing specific instances of the workload, and thereby avoids capital expenditures for the resources by renting usage of resources and services from a third-party provider of cloud computing services. Such services are typically made available by the third party provider as a utility, or on a subscription basis. A large business enterprise or other organization may also provide private cloud computing services, which may be used by one or more business units and lines of business of the organization instead of employing their own local resources.

While a user entity that requires data processing services may realize significant benefits or value by processing a workload using cloud computing, rather than using the resources of its own processing system or environment, such action is also likely to have undesired costs or burdens. Before a workload can be processed using cloud computing services, the workload may have to be transformed so it conforms to certain form and standards required by computing services. Such transformation entails certain costs or burdens. Accordingly, before a user entity transforms a workload for delivery to a cloud computing environment, it is desirable for the entity to perform an analysis to determine both the value that will be realized thereby, and the cost or effort that will be incurred. Such value and effort is dependent on the processing environment of the user entity. It is anticipated that for some workloads, the analysis will show that cloud computing is not a preferable alternative to the user entity's own system resources. Moreover, both the value and effort of cloud computing can vary widely among workloads of different types.

Herein, for clarity, the term "value" is used to mean the value, benefits and advantages including monetary, time-value, and other economic gains which a user entity expects to realize by delivering a particular workload to a cloud computing environment, for processing thereby. The term "effort" is used to refer collectively to all undesired costs, burdens, efforts or pains which the user entity expects will result, if such action is taken. The term "user entity processing system" is used herein to mean the infrastructure and other resources collectively available to a user entity in its own environment, which will be used to process respective workloads if the workloads are not delivered to a cloud computing environment.

At present, an analysis as described above can require detailed data collection about workloads and infrastructure. The collected data must then be analyzed or assessed, in order to determine whether or not there will be an overall benefit if cloud computing is used for a particular workload rather than using the entity processing system. An important disadvantage of this approach is that substantial time and cost may be required for the assessment.

In an alternative approach, a whitepaper is made available, which shows both the benefit and cost that may be expected when workloads of different types are delivered to a cloud computing environment. However, the benefit and cost amounts in this approach are typically directed to a generic or "average" workload of a particular type. As a result, the benefits and amounts provided by the whitepaper may not be pertinent to a user entity workload that has certain characteristics or attributes which cause it to be quite different, in regard to cloud computing, from the generic workload of its type that is used in creating the whitepaper.

SUMMARY

Embodiments of the invention are directed to a method and system for rapidly identifying workloads that are appropriate for transformation and processing on a cloud computing environment, and for further identifying other workloads that are not appropriate for such treatment, and ordering, ranking, and grouping the workloads by the realized value or effort required. The cloud computing environment is virtualized, standardized and scalable, and may be automatically managed.

One embodiment of the invention is directed to a method for providing a user entity with a measurement of at least one of the value which will be realized, and the effort which will be required, if a given workload selected from one or more workloads associated with a user entity is delivered to a cloud computing environment for processing thereby, instead of being processed by the user entity processing system. The method comprises specifying a plurality of attributes, wherein each attribute pertains to a characteristic that the user entity processing system possesses to some extent, with respect to the given workload. The method further comprises acquiring input data for each attribute, wherein input data for a given attribute provides a measurement, on a prespecified scale, that represents the extent to which the user entity processing system possesses the given attribute. The input data for each attribute is employed to derive respectively corresponding numerical parameter values, and at least some of the parameter values are used in a specified mathematical model to compute a final score, wherein the final score comprises the measurement, selectively, of the value which will be realized, or the effort which will be required.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
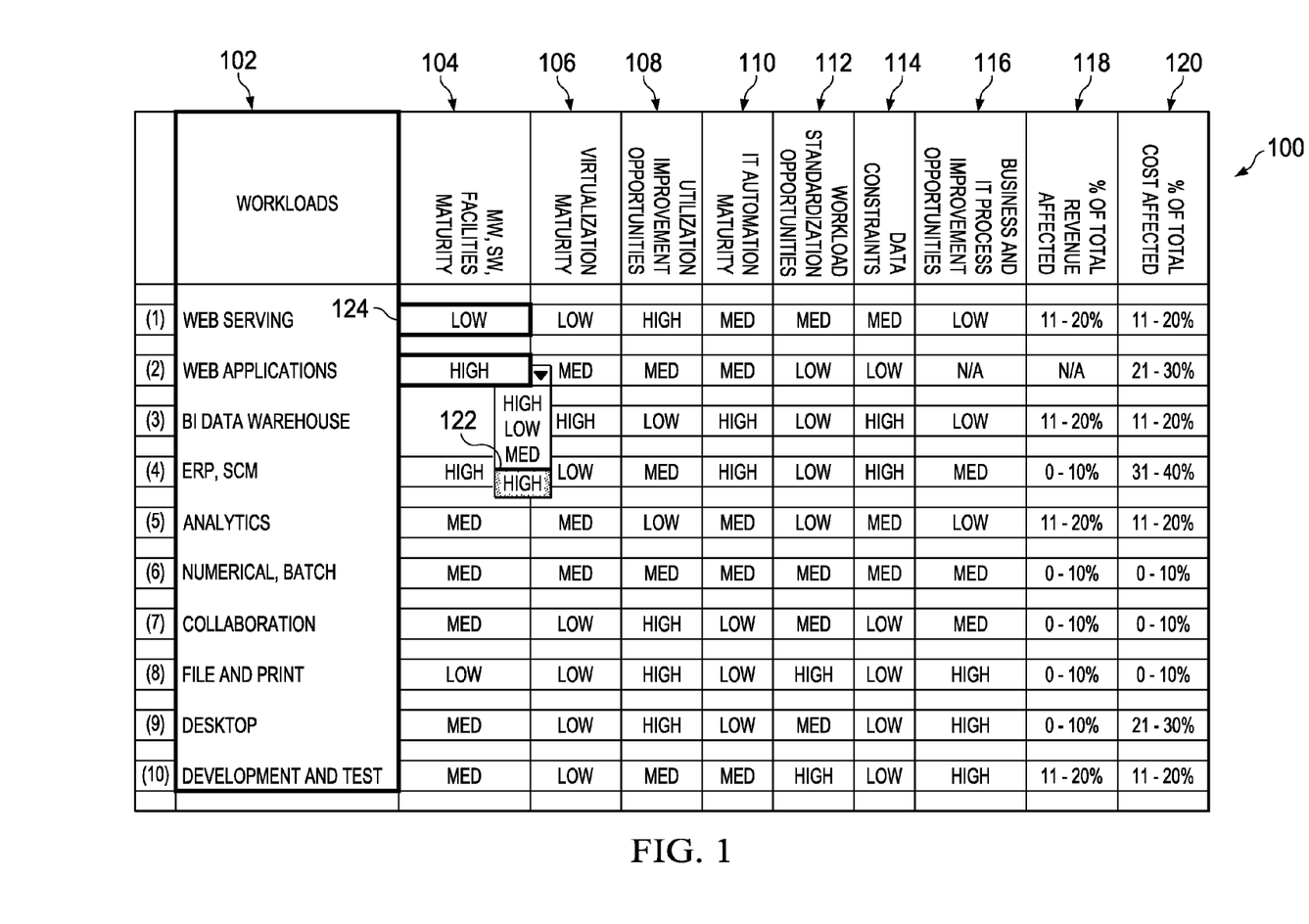
FIG. 1 depicts a spreadsheet that contains exemplary workload types, characterizing attribute categories, and associated input data, for illustrating an embodiment of the invention.

As discussed above, when a user entity or organization is considering whether or not to deliver a workload to a cloud computing environment, rather than using resources of its own entity processing system to service the workload, both the value and the effort resulting from such action can vary widely, for workloads of different classes or types. The value and effort are also very dependent on the particular state or condition of the environment and processing resources of the user entity. Therefore, in order to significantly improve accuracy in determining the expected value and effort for workloads of different types, embodiments of the invention initially acquire certain input data, in connection with each of the workloads. The input data also pertains to different important attributes or characteristics of the user entity processing system. FIG. 1 illustrates an approach for acquiring such input data for an embodiment of the invention, which can then be used to determine the expected value and effort for respective workloads.

Referring to FIG. 1, there is shown a spreadsheet 100 with multiple cells such as cell 124, which are arranged in rows and columns More particularly, spreadsheet 100 comprises rows (1)-(10) and columns 102-120. Each of the rows of column 102 identifies a workload of a particular type, which is well known to those of skill in the art. These workloads respectively include web serving; web applications; business intelligence (BI); data warehousing; enterprise resource planning (ERP); analytics; numerical and batch processing activities; collaboration; file and print related processing; desktop; and development and testing activities. Majority of workloads processed in a datacenter environment belong to one of these types. Workloads of each of these types may frequently be considered by a user entity or organization for transformation and delivery to a cloud computing environment, rather than processing the workload using its own processing system resources. It is to be emphasized that embodiments of the invention are not limited to workloads of the types shown in FIG. 1. FIG. 1 also shows a reader 122.

Referring further to FIG. 1, there is shown each of the columns 104-120 comprising a category that pertains to an important attribute or characteristic of the user entity processing system. The extent to which the user entity system possesses each of these attributes indicates how beneficial it would be to deliver a particular workload to a cloud computing environment for processing, rather than retaining the workload in the user entity processing system. For example, column 104 pertains to the maturity of the infrastructure and software stack of the user entity system resources. This attribute provides a measure of the comparative age and heterogeneity of such resources. Accordingly, a low rating or score for this attribute would imply that use of cloud computing resources for a workload, rather than the resources of the user entity, could be quite beneficial for the user entity. The attributes or characteristics for respective categories of columns 106-120 are described hereinafter in further detail.

In FIG. 1, each cell thereof, such as cell 124, is defined by the intersection of one of the workloads (1)-(10), and the attribute category of one of the columns 104-120. Each cell contains input data that pertains to its corresponding workload and attribute. In order to acquire the input data for a given cell, a set of questions is generated, wherein the questions are directed to the attribute or characteristic of the user entity system to which the given cell corresponds. The questions are presented to human users, administrators, and others, who may be a specialist or person of knowledge in regard to the attribute or characteristic. The user then answers the set of questions with respect to the workload that the given cell corresponds to, and the questions are processed collectively, in order to provide an input data entry for the given cell of spreadsheet 100. In addition, the user furnishes answers to the same set of questions in regard to a specific attribute of each of the other workload types (1)-(10) that are relevant to the user. Thus, an input data entry is provided for each cell in the attribute column of spreadsheet 100, to which the question set pertains. The entry could be different for different workloads of the column.

In the above embodiment, one set of ten questions is usefully provided for the attribute category of each of the columns 104-120. Each of the questions of a set is formulated as either a true or false statement, in order to minimize the effort required to answer respective questions. An exemplary set of such questions, for the column 104 attribute of hardware and software facilities maturity of the user entity processing system, is as follows:
1. At most one or two types of server architectures in use?
2. At most one or two models for each server architecture are in use?
3. Servers are roughly of the same age?
4. Servers are less than 1 or 2 years old?
5. At most one or two types of OS in use?
6. At most one or two versions of each type of OS in use?
7. For each version of OS, at most one or two releases in use?
8. For each major middleware component (such as database, application server, web server, messaging and queuing systems) and application software, is there single vendor support?
9. At most one or two versions and one or two releases per major middleware component and application software?
10. Complete and up-to-date inventory of hardware and software used to run the workload is maintained?

A further example of a question set, for the column 106 attribute of virtualization maturity, is as follows:
1. Fraction of the workload processed using virtual servers is two thirds or higher?
2. Fraction of the workload processed using virtual servers is one third or higher?
3. At most one virtualization technology is used per server architecture?
4. At most one generation of each virtualization technology is in use?
5. Less than two virtualization technologies and one generation per virtualization technology in use?
6. At most two generations of a single virtualization technology in use?
7. At least two thirds of the virtual servers have similar configurations and any differences are minor?
8. At least one third of the virtual servers have similar configurations and any differences are minor?
9. Over two thirds of the virtual servers deployed use latest generation virtualization technology available?
10. Over one third of the virtual servers deployed use latest generation virtualization technology available?

It will be appreciated that the answers to each set of questions collectively provides a thorough assessment of the attribute of the user entity processing system to which the questions of the set respectively pertain. It is anticipated that other sets of questions to achieve this purpose could be provided by those of skill in the art for each attribute of columns 104-120, respectively.

If each set of questions comprises ten true or false questions as described above, the data entry for each cell of spreadsheet 100 may usefully be determined by considering the number of questions that are answered true. Thus, if the set of questions used for the cell defined by a given attribute category and a given workload resulted in 8-10 true answers, the data entry would be "High". This would indicate that resources of the user entity processing system possessed the given attribute to a great extent, in regard to the given workload. If there were 6-7 true answers, the data entry would be "Medium". The data entry would be "Low" for 0-5 true answers.

In a further embodiment of the invention, questions for the attribute categories 104 and 106 could usefully be answered by the system administrator of the user entity. The attributes of columns 102, 110 and 112 pertain to utilization improvement opportunities, IT automation maturity, and workload standardization opportunities, respectively. These questions usefully could be answered by a system administrator, user, and/or an IT operations manager of the IT systems, middleware, and applications. The attributes of columns 114 and 116 pertain to data constraints and business and IT process improvement opportunities, respectively. These questions could be answered by an application architect, or by an end user. Categories 118 and 120, respectively, pertain to the percentage of total revenue affected, and the percentage of total costs affected. Questions pertaining thereto could be answered by one having financial knowledge.

In some embodiments of the invention, the questions could be presented by a human interviewer, in a person-to-person interactive question and answer session. In other embodiments, the questions could be presented on paper or by e-mail or other electronic communication media, and answers to the same questions would be returned using the same or another media. As a further alternative, the questions could be embedded in a selected tool, wherein the tool presents each question interactively, and for a true or false answer.

It will be appreciated that spreadsheet 100 of FIG. 1 contains a great deal of information regarding respective workloads and capabilities of the user entity processing system. It is also anticipated that this information can be acquired with comparatively little delay, upon presenting pertinent sets of questions to persons of knowledge, as described above. As soon as this information becomes available, it can be delivered to an interactive tool or the like, which is configured in accordance with one or more mathematical models. One such model would use the data from the spreadsheet pertaining to a given workload to compute $V_{WL}$ for the given workload. $V_{WL}$ is the total value that is expected to be realized, if the given workload is transformed and processed using a cloud computing environment. Another model would use data from the spreadsheet pertaining to the given workload to compute $E_{WL}$ for the given workload. $E_{WL}$ is the total effort that is expected to be required, if the given workload is transformed for processing on the cloud computing environment.

In one embodiment, $V_{WL}$ is as follows:

$$V_{WL} = V_{CapEx} + V_{OpEx} + V_{Eff} + V_{Intr} \quad \text{Equation (1)}$$

$V_{WL}$ is the total value or benefit that is expected by the user entity from transforming a given workload WL, and processing the given workload using a cloud computing environment. For each workload, $V_{WL}$ will be an amount or score that is in the range [0, 10]. A high score for $V_{WL}$ implies a high value or gain from use of cloud computing. Contributions to $V_{WL}$ from its respective components $V_{CapEx}$, $V_{OpEx}$, $V_{Eff}$ and $V_{Intr}$ are normalized using weights. In Equation (1), $V_{CapEx}$ is the value realized from reducing capital expenses; $V_{OpEx}$ is the value realized from reducing operational expenses; $V_{Eff}$ is the value realized from efficiency gains in IT and associated business; and $V_{Intr}$ is a workload specific intrinsic value.

In the above embodiment of the invention, $E_{WL}$ is as follows:

$$E_{WL} = E_{CapEx} + E_{OpEx} + E_{Data} + E_{Intr} \quad \text{Equation (2)}$$

$E_{WL}$ is the total effort, cost or burden that is expected by the user entity in transforming the given workload WL, and delivering the given workload for processing to a cloud computing environment. For each workload, $E_{WL}$ will be an amount or score that is in the range [0, 10], in like manner with $V_{WL}$. A high score for $E_{WL}$ implies a high transformation effort required to use the cloud computing environment to process the workload. Contributions to $E_{WL}$ from its respective components $E_{CapEx}$, $E_{OpEx}$, $E_{Data}$ and $E_{Intr}$ are normalized using weights, in like manner with $V_{WL}$. $E_{CapEx}$ is the effort associated with transforming infrastructure and other capital expense related items; $E_{OpEx}$ is the effort associated with reducing operational expenses; $E_{Data}$ is the effort associated with handling data constraints; and $E_{Intr}$ is the effort inherent to workload complexity.

Both the components of $V_{WL}$ as shown by Equation (1) and the components of $E_{WL}$ as shown by Equation (2), can be determined for a given workload from input data for the given workload contained in spreadsheet 100, combined with certain weights that are described hereinafter in further detail. Respective steps of a method for computing these components for $V_{WL}$ and $E_{WL}$ are shown by the flowchart of FIG. 2.

Figure 2:
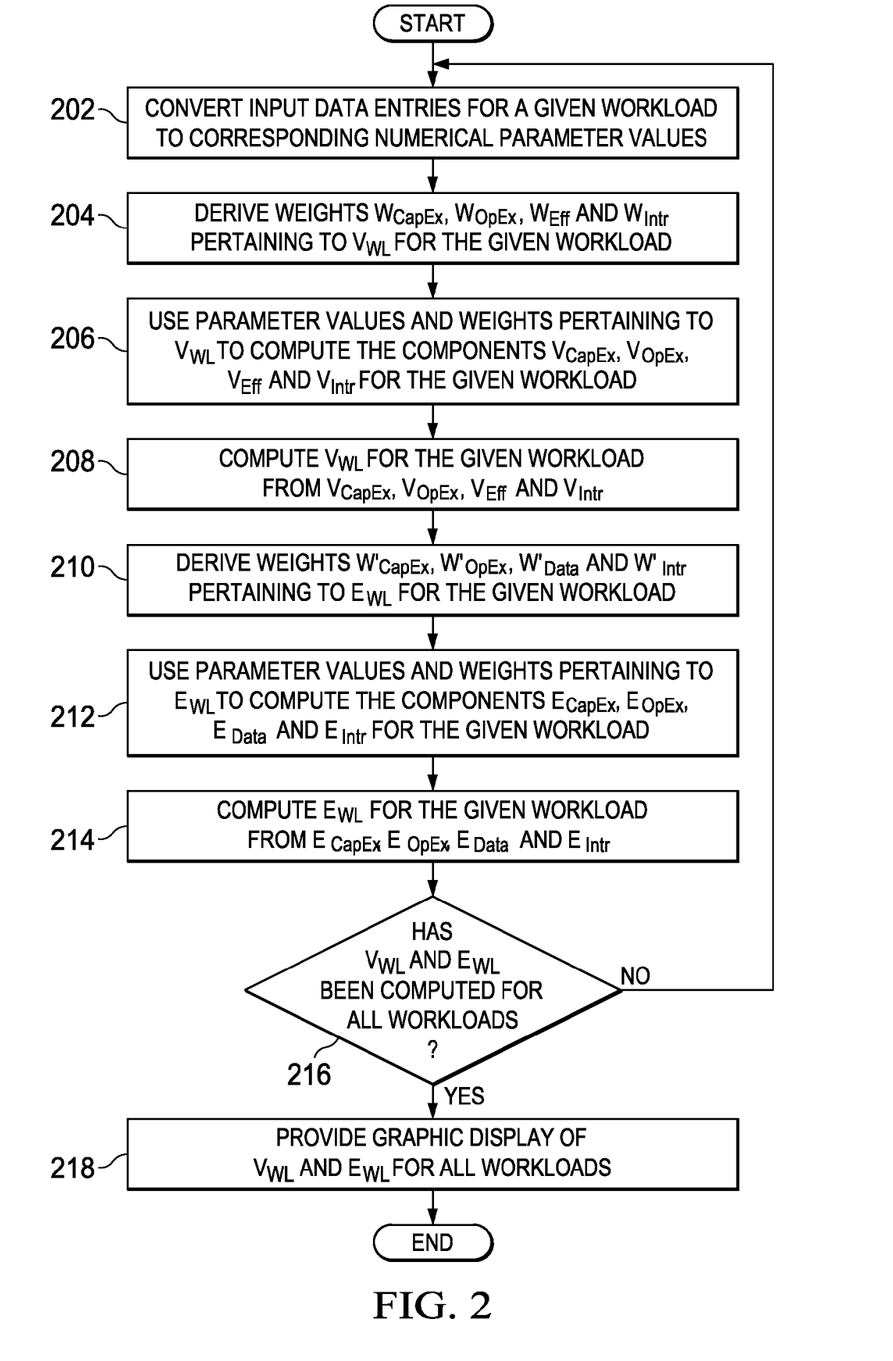
FIG. 2 is a flowchart showing steps for a method comprising an embodiment of the invention.

Referring to FIG. 2, step 202 thereof discloses converting input data entries for a given workload to respectively corresponding numerical parameter values. To illustrate this, reference is made to cell 124 of spreadsheet 100, shown in FIG. 1. Cell 124 contains input data that pertains to the web serving workload, for the attribute or characteristics of column 104. As described above, this attribute is the infrastructure and software stack maturity of the user entity resources. For each workload of column 104, a numerical parameter value $M_{Infra}$ is determined from the input data entry for the workload. $M_{Infra}$ provides a measure of the hardware and software maturity of the user entity facility, and indicates the homogeneity and technology readiness thereof. A high value of $M_{Infra}$ for a given workload would thus imply that the gain or benefit realized from using cloud computing instead of existing computing environment would be comparatively low.

FIG. 1 shows a data input entry of "Low" for cell 124. In order to convert this data entry into a numerical parameter value $M_{Infra}$, a table is usefully constructed which is responsive to the entry in cell 124. The table would provide one of three prespecified values, which are each in the range [0, 10], depending on whether the entry was "Low", "Medium", or "High". A similar table would be constructed for each of the other workloads in column 104. The values provided by the table for each workload would be adjusted to account for the particular characteristics of the workload.

For each data entry of the workloads in column 106 of spreadsheet 100, the numerical parameter value $M_{Virt}$ is determined. $M_{Virt}$ indicates the degree of virtualization, homogeneity in virtualization and adoption of latest generation technologies, in the user entity environment.

$O_{Util}$, the numerical parameter value of column 108 of spreadsheet 100, measures the degree to which low and variable utilization of hardware and software by the given workload can be leveraged by use of cloud computing, rather than by using the user entity resources, in order to achieve lower software and hardware costs.

$M_{Auto}$, the numerical parameter value of column 110 of spreadsheet 100, measures the degree of automation in IT management of the user entity environment.

$O_{Std}$, the numerical parameter value of column 112 of spreadsheet 100, measures the degree to which standardization in workload processing, hardware, virtualization, and software management can provide opportunities that can be leveraged by cloud computing to reduce hardware and software and management costs.

$I_{Data}$, the numerical parameter value of column 114 of spreadsheet 100, measures the degree of constraints on the data associated with the workload. Security, privacy, compliance, reliability, availability and disaster recoverability, for example, all add constraints on how data associated with a workload is to be treated. Increasing the degree of constraints reduces the transformation choices, raises the transformation costs, and reduces the value realized using cloud computing.

$O_{BP}$, the numerical parameter value of column 116 of spreadsheet 100, measures the degree to which business processes and IT processes that are dependent on the workload will realize productivity and efficiency gains, by using cloud computing rather than the user entity's own resources.

Tables as described above are usefully constructed and employed to convert respective input data entries in columns 106-116 to corresponding numerical parameter values.

Referring further to FIG. 2, weights for use in computing $V_{WL}$ for the given workload are derived at step 204. These include $W_{CapEx}$, which is a weight associated with capital expenses; $W_{OpEx}$, associated with operational expenses; $W_{Eff}$, associated with efficiency gains; and $W_{Intr}$, which is associated with workload specific intrinsic value. These weights are to be interpreted as the maximum transformation value that can be derived under optimal conditions. The ratio $W_{CapEx}$: $W_{OpEx}$:$W_{Eff}$:$W_{Intr}$ is workload dependent, and ideally this ratio is empirically derived by using controlled or canonical cases. Weights may be assigned equal values, but it is preferred to select weights proportionately, based on a learned understanding of the characteristics of each workload. Weights are also selected to normalize value scores between 1 and 10.

At step 206, the numerical parameter values and weights generated for the given workload at step 204 are used to compute the components $V_{CapEx}$, $V_{OpEx}$, $V_{Eff}$ and $V_{Intr}$ for the given workload. The following relationships may be used for these computations:

$$V_{CapEx} = W_{CapEx} \cdot \left( \frac{1}{M_{Infra}} + \frac{1}{M_{Virt}} + O_{Util} \right) \quad \text{Equation (3)}$$

$$V_{OpEx} = W_{OpEx} \cdot \left( \frac{1}{M_{Virt}} + \frac{1}{M_{Auto}} + O_{Std} \right) \quad \text{Equation (4)}$$

$$V_{Eff} = W_{Eff} \cdot \left( \frac{1}{I_{Data}} + O_{BP} \right) \quad \text{Equation (5)}$$

$$V_{Intr} = W_{Intr} \cdot \left( 1 - \frac{(V_{CapEx} + V_{OpEx} + V_{Eff})}{(W_{CapEx} + W_{OpEx} + W_{Eff})} \right) \quad \text{Equation (6)}$$

After computing values for the respective components at step 206, the computed values are used at step 208 of FIG. 2 to compute $V_{WL}$ for the given workload. Equation (1) set forth above is used for this purpose.

At step 210, weights for use in computing $E_{WL}$ for the given workload are derived. These include $W'_{CapEx}$, which is a weight associated with capital expense reduction effort; $W'_{OpEx}$, which is a weight associated with operational expense reduction effort; $W'_{Data}$, which is a weight associated with effort related to data constraints; and $W_{Intr}$, which is a weight associated with effort pertaining to workload specific intrinsic value. These weights are selected to normalize effort scores between 1 and 10.

At step 212, the numerical parameter values and weights generated for the given workload at step 210 are used to compute the components $E_{CapEx}$, $E_{OpEx}$, $E_{Data}$ and $E_{Intr}$ for the given workload. The following relationships may be used for these computations:

$$E_{CapEx} = W'_{CapEx} \cdot \left( \frac{1}{M_{Infra}} + \frac{1}{M_{Virt}} \right) \quad \text{Equation (7)}$$

$$E_{OpEx} = W'_{OpEx} \cdot \left( \frac{1}{M_{Virt}} + \frac{1}{M_{Auto}} + O_{Std} \right) \quad \text{Equation (8)}$$

$$E_{Data} = W'_{Data} \cdot C_{Data} \quad \text{Equation (9)}$$

$$E_{Intr} = W'_{Intr} \cdot \left( 1 - \frac{(E_{CapEx} + E_{OpEx} + E_{Data})}{(W'_{CapEx} + W'_{OpEx} + W'_{Data})} \right) \quad \text{Equation (10)}$$

After computing the respective components of step 212, the computed values are used at step 214 of FIG. 2 to compute $E_{WL}$ for the given workload. Equation (2) set forth above is used for this purpose.

Step 216 of FIG. 2 is a decision step, which determines whether $V_{WL}$ and $E_{WL}$ have been computed for all workloads to be analyzed. If so, the method proceeds to step 218. Otherwise, the method returns to step 202, and steps 202-214 are carried out for a workload which still needs to have its $V_{WL}$ and $E_{WL}$ scores computed.

Figure 3:
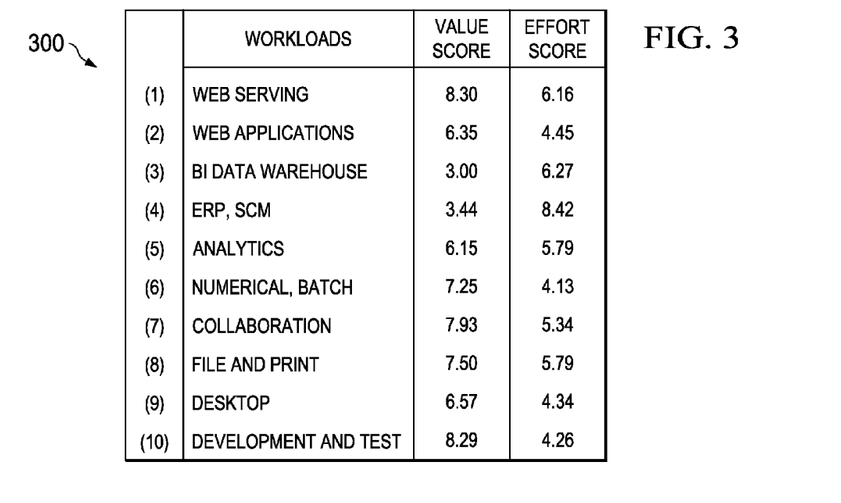
FIG. 3 is a chart showing exemplary anticipated value and effort scores that will result from delivering respective workloads of FIG. 1 to a cloud computing environment.
Figure 4:
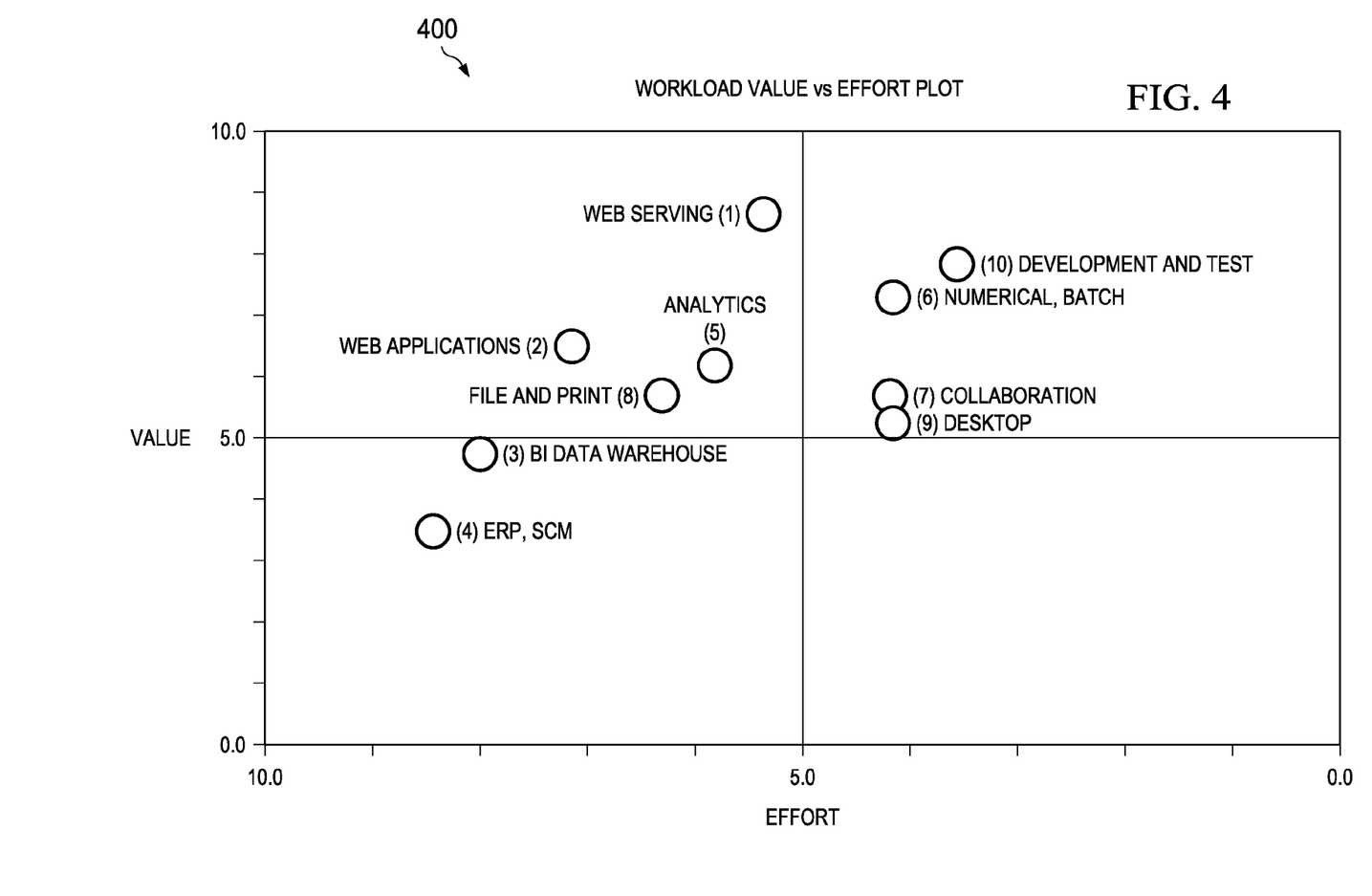
FIG. 4 is a graph showing a plot of exemplary value versus effort scores, for respective workloads of FIG. 1.

At step 218 the computed score or value for $V_{WL}$ and $E_{WL}$ is graphically displayed for each workload. FIGS. 3 and 4 illustrate alternative or complementary displays which may be used for presenting the $V_{WL}$ and $E_{WL}$ information for respective workloads to a user.

Referring to FIG. 3, there is shown a chart or table 300 that contains exemplary values for the $V_{WL}$ score and $E_{WL}$ score, computed as described above, for each of the workloads (1)-(10) of FIG. 1. The particular values of $V_{WL}$ and $E_{WL}$ used in FIG. 3 are selected for purposes of illustration, and are not intended to be limiting in any way. If a user entity does not have all types of workloads, results for only the relevant workloads are shown in FIG. 3 and FIG. 4.

Referring to FIG. 4, there is shown a graph 400, wherein the $V_{WL}$ score is plotted versus the $E_{WL}$ score for each of the workloads (1)-(10). $V_{WL}$ is shown along the vertical axis of graph 400, and $E_{WL}$ is shown along the horizontal axis. The particular values of $V_{WL}$ and $E_{WL}$ used in FIG. 4 are selected for purposes of illustration, and are not intended to be limiting in any way.

Figure 5:
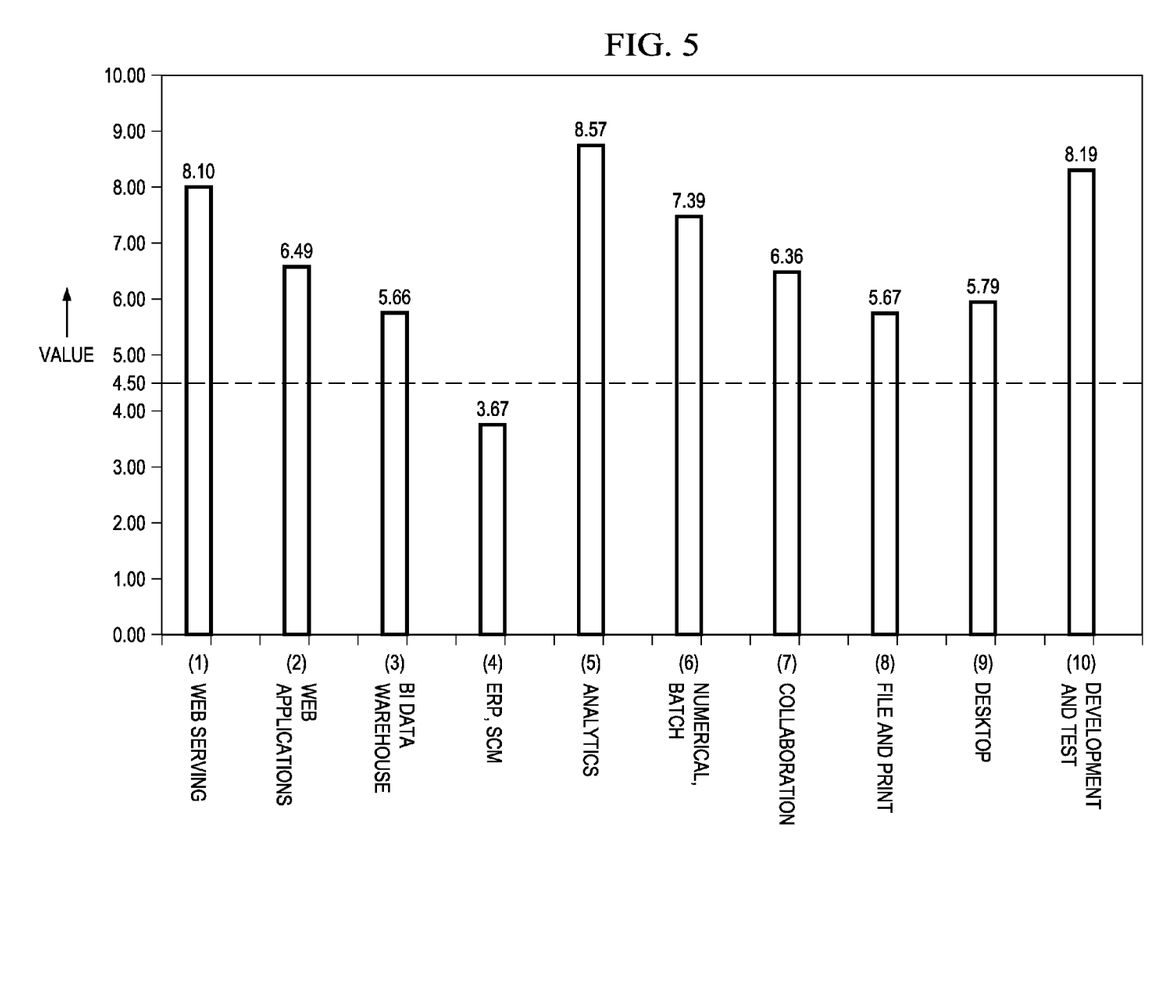
FIG. 5 is a bar chart showing exemplary value scores for respective workloads of FIG. 1, with an illustrative filtering criterion.

Referring to FIG. 5, there is shown a vertical bar graph 500, wherein an exemplary $V_{WL}$ score is shown along the vertical axis for each of the workloads (1)-(10). FIG. 5 also shows a filtering criterion or level 502, selected by way of example to be 4.5. This filtering criterion is prespecified, based on an evaluation of total business impact. Each workload may be selected for processing using the cloud computing environment, only if its $V_{WL}$ score exceeds the criterion 502. Thus, criterion 502 performs a filtering function. In this example, workload (4) would be excluded from cloud computing.

Figure 6:
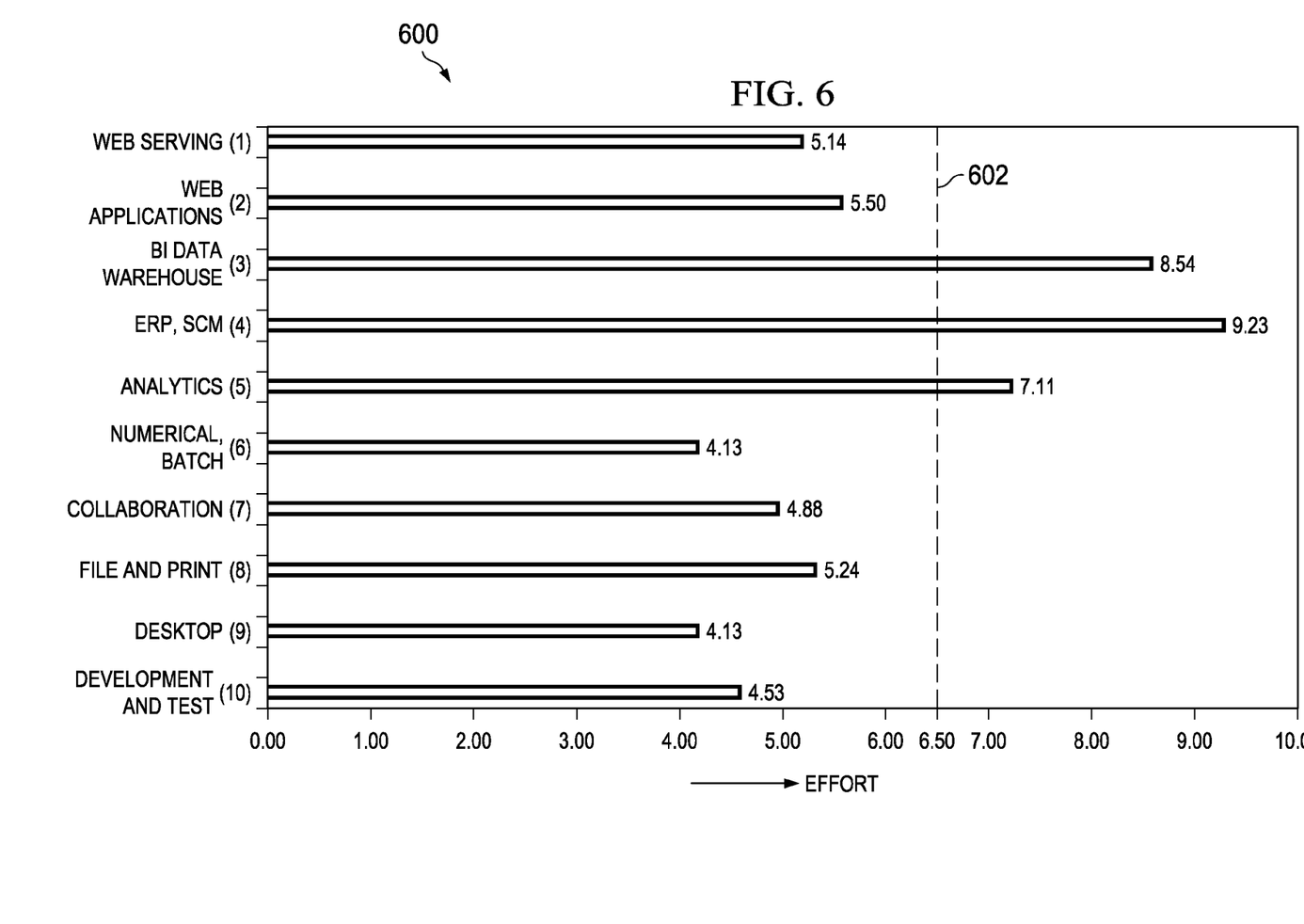
FIG. 6 is a bar chart showing exemplary effort scores for respective workloads of FIG. 1, with an illustrative filtering criterion.

Referring to FIG. 6, there is shown a horizontal bar graph 600, wherein an exemplary $E_{WL}$ score is shown along the horizontal axis for each of the workloads (1)-(10). FIG. 6 also shows a filtering criterion 602, selected by way of example to be 6.5. This filtering criterion is prespecified, based on an evaluation of total business impact. Each workload may be selected for processing using the cloud computing environment, only if its $E_{WL}$ score is less than the criterion 602. Thus, criterion 602 performs a filtering function in like manner with criterion 502. In this example, workloads (3), (4) and (5) would be excluded from cloud computing.

FIGS. 5 and 6 illustrate that by providing each of a number of workloads with numerical value and effort scores, the respective workloads can be readily selected or rejected for cloud computing. This is done by furnishing numerical criteria, based on evaluation of total business impact. Such criteria can also be used to selectively rank, order and/or group the workloads.

It should be appreciated that the simple workload filtering criteria as described above is for illustration purposes only. More complex criteria may be constructed and used in practice. For example, the filtering criteria may be different for each workload. The criteria could also be a function of the value and/or effort associated with one or more other workloads, and so on.

In evaluating the value of the business impact of a workload, it would be useful to include the percent of revenue gain or market share gain, or the percentage of total revenue affected, as shown by column 118 of FIG. 1. The values of respective workloads could then be compared with one another to rank the workloads. Similarly, the effect of effort on the business impact associated with respective workloads could be evaluated by considering the percentage increase of the expenses in the balance sheet, or the percentage of total cost affected, as shown by column 120 of FIG. 1.

Figure 7:
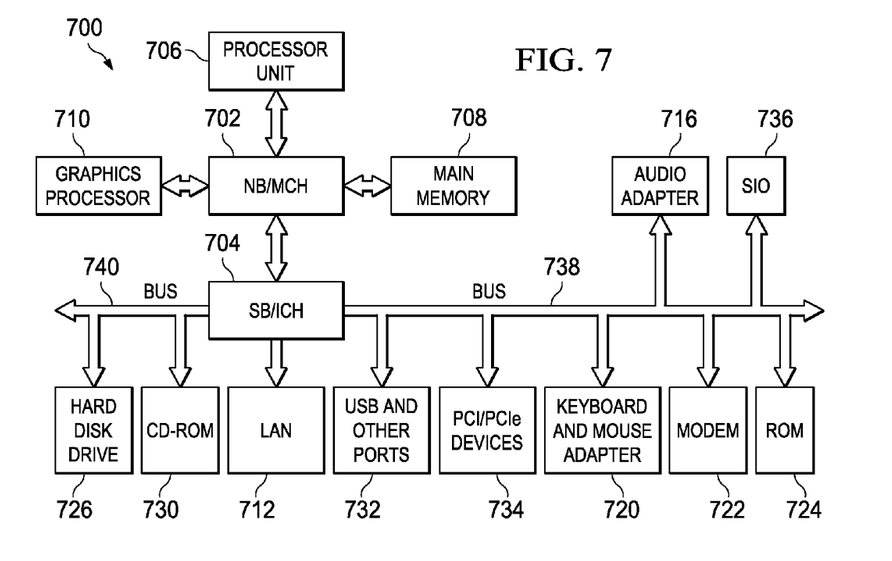
FIG. 7 is a block diagram showing a computer or data processing system for use in implementing embodiments of the invention.

Referring to FIG. 7, there is shown a data processing system 700 that may be used in implementing embodiments of the invention, such as the embodiment of FIG. 2. Data processing system 700 is an example of a computer in which computer usable code or instructions implementing the processes for embodiments of the present invention may be located.

Data processing system 700 employs a hub architecture including north bridge and memory controller hub (MCH) 702 and south bridge and input/output (I/O) controller hub (ICH) 704. Processing unit 706, main memory 708, and graphics processor 710 are connected to north bridge and memory controller hub 702. Graphics processor 710 may be connected to north bridge and memory controller hub 702 through an accelerated graphics port (AGP).

In data processing system 700, local area network (LAN) adapter 712 connects to south bridge and I/O controller hub 704. Audio adapter 716, keyboard and mouse adapter 720, modem 722, read only memory (ROM) 724, hard disk drive (HDD) 726, CD-ROM drive 730, universal serial bus (USB) ports and other communications ports 732, and PCI/PCIe devices 734 connect to south bridge and I/O controller hub 704 through bus 738 and bus 740. PCI/PCIe devices may include, for example, Ethernet adapters, add-in cards and PC cards for notebook computers. PCI uses a card bus controller, while PCIe does not. ROM 724 may be, for example, a flash binary input/output system (BIOS).

Hard disk drive 726 and CD-ROM drive 730 connect to south bridge and I/O controller hub 704 through bus 740. Hard disk drive 726 and CD-ROM drive 730 may use, for example, an integrated drive electronics (IDE) or serial advanced technology attachment (SATA) interface. Super I/O (SIO) device 736 may be connected to south bridge and I/O controller hub 704.

An operating system runs on processing unit 706 and coordinates and provides control of various components within data processing system 700 in FIG. 7. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 700 (Java is a trademark of Sun Microsystems, Inc. in the United States, other countries, or both).

Instructions for the operating system, the object-oriented programming system, and applications or programs are located on storage devices, such as hard disk drive 726, and may be loaded into main memory 708 for execution by processing unit 706. The processes for embodiments of the present invention are performed by processing unit 706 using computer usable program code, which may be located in a memory such as, for example, main memory 708, read only memory 724, or in one or more peripheral devices 726 and 730.

A bus system may be comprised of one or more buses, such as bus 738 or bus 740 as shown in FIG. 7. Of course the bus system may be implemented using any type of communications fabric or architecture that provides for a transfer of data between different components or devices attached to the fabric or architecture. A communications unit may include one or more devices used to transmit and receive data, such as modem 722 or network adapter 712 of FIG. 7. A memory may be, for example, main memory 708, read only memory 724, or a cache such as found in north bridge and memory controller hub 702 in FIG. 7.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring use of a cloud computing environment, the method comprising:
   a computer determining an amount of effort for completing a task in the cloud computing environment;
   the computer calculating a measurement of value for completing the task based on a mathematical model
   the computer presenting each workload of a plurality of workloads in a graph, wherein a given workload is positioned with respect to first and second axes of the graph according to first and second final scores, respectively, of the given workload; and
   the computer selecting a given workload for delivery to the cloud computing environment for processing thereby only when the given workload complies with at least one of a first criterion and a second criterion, wherein the given workload complies with the first criterion when the first final score of the given workload exceeds a first pre-specified criterion value, and the given workload complies with the second criterion when the second final score of the given value is less than a second pre-specified criterion value.

2. The method of claim 1, further comprising:
   the computer providing a user entity with the measurement of value and the amount of effort when delivering a given workload to a cloud computing environment for processing thereby, instead of being processed by a user entity processing system originally associated with the given workload.

3. The method of claim 1, further comprising:
   incorporating the mathematical model in an interactive tool adapted to automatically derive each of the amount of effort and the measurement of value.

4. The method of claim 1, further comprising:
   the computer applying numerical values in the mathematical model to compute the first final score and the second final score for each workload of the plurality of workloads, wherein the first and second final scores for a given workload comprise measurements, respectively, of the amount of effort and the measurement of value.

5. The method of claim 1, further comprising:
   the computer presenting the first final score and the second final score in a visual display.

6. The method of claim 1, wherein:
   the computer using both the first final score and the second final score of a given workload to compare, rank, order and group the given workload, selectively, with respect to other of the workloads.

7. The method of claim 1, wherein:
   the computer representing the first final score of the given workload by a percent of a revenue gain resulting from delivering the given workload to the cloud computing environment, and representing the second final score of the given workload by a percent of an increase in expense in a balance sheet resulting from delivering the given workload to the cloud computing environment.

8. A system for monitoring use of a cloud computing environment, the system comprising:
   one or more processors, one or more computer readable storage devices, and one or more computer readable memories;
   computer program instructions stored on at least one computer readable storage device for execution by at least one processor via at least one computer readable memory for determining an amount of effort for completing a task in the cloud computing environment;
   computer program instructions stored on at least one computer readable storage device for execution by at least one processor via at least one computer readable memory for calculating a measurement of value for completing the task based on a mathematical model;
   computer program instructions stored on at least one computer readable storage device for execution by at least one processor via at least one computer readable memory for presenting each workload of a plurality of workloads in a graph, wherein a given workload is positioned with respect to first and second axes of the graph according to first and second final scores, respectively, of the given workload; and
   computer program instructions stored on at least one computer readable storage device for execution by at least one processor via at least one computer readable memory for selecting a given workload for delivery to the cloud computing environment for processing thereby only when the given workload complies with at least one of a first criterion and a second criterion, wherein the given workload complies with the first criterion when the first final score of the given workload exceeds a first pre-specified criterion value, and the given workload complies with the second criterion when the second final score of the given value is less than a second pre-specified criterion value.

9. The system of claim 8, further comprising:
   computer program instructions stored on at least one computer readable storage device for execution by at least one processor via at least one computer readable memory for providing a user entity with the measurement of value and the amount of effort when delivering a given workload to a cloud computing environment for processing thereby, instead of being processed by a user entity processing system originally associated with the given workload.

10. The system of claim 8, further comprising:

computer program instructions stored on at least one computer readable storage device for execution by at least one processor via at least one computer readable memory for incorporating the mathematical model in an interactive tool adapted to automatically derive each of the amount of effort and the measurement of value.

11. The system of claim 8, further comprising:

computer program instructions stored on at least one computer readable storage device for execution by at least one processor via at least one computer readable memory for applying numerical values in the mathematical model to compute the first final score and the second final score for each workload of the plurality of workloads, wherein the first and second final scores for a given workload comprise measurements, respectively, of the amount of effort and the measurement of value.

12. The system of claim 8, further comprising:

computer program instructions stored on at least one computer readable storage device for execution by at least one processor via at least one computer readable memory for the computer presenting the first final score and the second final score in a visual display.

13. The system of claim 8, wherein:

computer program instructions stored on at least one computer readable storage device for execution by at least one processor via at least one computer readable memory for using both the first final score and the second final score of a given workload to compare, rank, order and group the given workload, selectively, with respect to other of the workloads.

14. The system of claim 8, wherein:

computer program instructions stored on at least one computer readable storage device for execution by at least one processor via at least one computer readable memory for representing the first final score of the given workload by a percent of a revenue gain resulting from delivering the given workload to the cloud computing environment, and representing the second final score of the given workload by a percent of an increase in expense in a balance sheet resulting from delivering the given workload to the cloud computing environment.

15. A computer program product for monitoring use of a cloud computing environment, the computer program product comprising:

one or more non-transitory computer readable storage devices;

computer program instructions stored on at least one non-transitory computer readable storage device for determining an amount of effort for completing a task in the cloud computing environment;

computer program instructions stored on at least one non-transitory computer readable storage device for calculating a measurement of value for completing the task based on a mathematical model;

computer program instructions stored on at least one non-transitory computer readable storage device for presenting each workload of a plurality of workloads in a graph, wherein a given workload is positioned with respect to first and second axes of the graph according to first and second final scores, respectively, of the given workload; and computer program instructions stored on at least one non-transitory computer readable storage device for selecting a given workload for delivery to the cloud computing environment for processing thereby only when the given workload complies with at least one of a first criterion and a second criterion, wherein the given workload complies with the first criterion when the first final score of the given workload exceeds a first pre-specified criterion value, and the given workload complies with the second criterion when the second final score of the given value is less than a second pre-specified criterion value.

16. The computer program product of claim 15, further comprising:

computer program instructions stored on at least one non-transitory computer readable storage device for representing the first final score of the given workload by a percent of a revenue gain resulting from delivering the given workload to the cloud computing environment, and representing the second final score of the given workload by a percent of an increase in an expense in a balance sheet resulting from delivering the given workload to the cloud computing environment.

\* \* \* \* \*